United States Patent
Eitan

(10) Patent No.: US 9,876,604 B2
(45) Date of Patent: Jan. 23, 2018

(54) CHANNEL BONDING SIGNALING TO IN-RANGE DEVICES

(71) Applicant: QUALCOMM Incorporated, San Diego, CA (US)

(72) Inventor: Alecsander Eitan, Haifa (IN)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 15/135,388

(22) Filed: Apr. 21, 2016

(65) Prior Publication Data

US 2016/0329986 A1    Nov. 10, 2016

Related U.S. Application Data

(60) Provisional application No. 62/157,909, filed on May 6, 2015.

(51) Int. Cl.
| | |
|---|---|
| *H04W 4/00* | (2009.01) |
| *H04L 1/00* | (2006.01) |
| *H04L 29/06* | (2006.01) |
| *H04W 74/08* | (2009.01) |
| *H04W 84/12* | (2009.01) |

(52) U.S. Cl.
CPC ............ *H04L 1/0011* (2013.01); *H04L 69/22* (2013.01); *H04W 74/0816* (2013.01); *H04W 84/12* (2013.01)

(58) Field of Classification Search
CPC .. H04L 1/0011; H04L 69/22; H04W 74/0816; H04W 84/12
USPC .......................... 370/335, 342; 455/450, 445
See application file for complete search history.

(56) References Cited

U.S. PATENT DOCUMENTS

| | | | | |
|---|---|---|---|---|
| 6,868,072 | B1 * | 3/2005 | Lin ..................... | H04L 12/2803 370/276 |
| 8,498,280 | B2 * | 7/2013 | Das ....................... | H04W 28/06 370/338 |
| 9,307,557 | B2 * | 4/2016 | Kwon ..................... | H04L 47/10 |
| 9,363,824 | B2 * | 6/2016 | Jung ..................... | H04L 5/0037 |
| 2004/0028000 | A1 * | 2/2004 | Billhartz .................. | H04L 1/00 370/312 |

(Continued)

FOREIGN PATENT DOCUMENTS

| | | |
|---|---|---|
| WO | WO-2006000955 A1 | 1/2006 |
| WO | WO-2011156201 A2 | 12/2011 |

OTHER PUBLICATIONS

International Search Report and Written Opinion—PCT/US2016/029039—ISA/EPO—Jul. 7, 2016.

*Primary Examiner* — Wutchung Chu
*Assistant Examiner* — Berhanu Belete
(74) *Attorney, Agent, or Firm* — Loza & Loza LLP

(57) ABSTRACT

In certain aspects of the present disclosure, an apparatus for wireless communications comprises a processing system configured to generate a frame comprising first information indicating a plurality of channels to be used by the apparatus for a transmission and second information indicating a time duration of the transmission. The apparatus also comprises an interface configured to output the frame for wireless transmission on at least one of the plurality of channels. In certain aspects of the present disclosure, another apparatus receiving the frame may determine the plurality of channels based on the first information, compute a time duration based on the second information, and avoid transmitting on the plurality of channels for at least the computed time duration (e.g., to avoid collision).

17 Claims, 10 Drawing Sheets

(56) References Cited

U.S. PATENT DOCUMENTS

| | | | | |
|---|---|---|---|---|
| 2004/0170194 A1* | 9/2004 | Moreton | H04W 52/0238 | 370/474 |
| 2005/0136933 A1* | 6/2005 | Sandhu | H04L 1/0072 | 455/450 |
| 2005/0152314 A1* | 7/2005 | Sun | H04B 7/0413 | 370/334 |
| 2006/0034178 A1* | 2/2006 | Yang | H04L 1/1607 | 370/236 |
| 2009/0046681 A1* | 2/2009 | Kalogridis | H04W 72/1289 | 370/338 |
| 2010/0035629 A1* | 2/2010 | Soliman | H04W 48/14 | 455/455 |
| 2010/0246600 A1* | 9/2010 | Das | H04W 28/06 | 370/465 |
| 2011/0128900 A1* | 6/2011 | Seok | H04W 74/04 | 370/311 |
| 2011/0274204 A1* | 11/2011 | Ko | H04L 1/0057 | 375/295 |
| 2012/0044361 A1* | 2/2012 | Riggsby | H03H 7/48 | 348/192 |
| 2012/0106536 A1* | 5/2012 | Natarahjan | H04W 56/0025 | 370/347 |
| 2013/0034091 A1* | 2/2013 | Kim | H04W 52/16 | 370/338 |
| 2013/0294445 A1* | 11/2013 | Chase | H04Q 11/04 | 370/357 |
| 2014/0341234 A1* | 11/2014 | Asterjadhi | H04L 69/324 | 370/474 |
| 2016/0094317 A1* | 3/2016 | Erceg | H04L 5/0007 | 370/330 |
| 2016/0191679 A1* | 6/2016 | Hwang | H04L 1/0006 | 375/340 |
| 2016/0316473 A1* | 10/2016 | Wang | H04W 72/0453 | |
| 2017/0171009 A1* | 6/2017 | Hwang | H04L 27/2649 | |

\* cited by examiner

| Field Name | Number of bits | Start bit |
|---|---|---|
| Scrambler Initialization | 7 | 0 |
| MCS | 5 | 7 |
| Length | 18 | 12 |
| Additional PPDU | 1 | 30 |
| Packet Type | 1 | 31 |
| Training Length | 5 | 32 |
| Aggregation | 1 | 37 |
| Beam Tracking Request | 1 | 38 |
| Last RSSI | 4 | 39 |
| Turnaround | 1 | 43 |
| Reserved | 4 | 44 |
| HCS | 16 | 48 |

FIG. 4

CHANNEL BONDING SIGNALING TO IN-RANGE DEVICES

RELATED APPLICATION

This application claims priority under 35 U.S.C. § 119(e) to U.S. Provisional Application No. 62/157,909 filed on May 6, 2015, the entire specification of which is incorporated herein by reference.

FIELD

Certain aspects of the present disclosure generally relate to wireless communications and, more particularly, to channel bonding signaling to in-range devices.

BACKGROUND

In order to address the issue of increasing bandwidth requirements demanded for wireless communications systems, different schemes are being developed. In some schemes, data is wirelessly transmitted at high data rates (e.g., several Gigabits/s) over one or more channels in the 60 GHz range.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

A first aspect relates to an apparatus for wireless communications. The apparatus comprises a processing system configured to generate a frame comprising first information indicating a plurality of channels to be used by the apparatus for a transmission and second information indicating a time duration of the transmission. The apparatus also comprises an interface configured to output the frame for wireless transmission on at least one of the plurality of channels.

A second aspect relates to a method for wireless communications. The method comprises generating a frame comprising first information indicating a plurality of channels to be used by an apparatus for a transmission and second information indicating a time duration of the transmission. The method also comprises outputting the frame for wireless transmission on at least one of the plurality of channels.

A third aspect relates to an apparatus for wireless communications. The apparatus comprises means for generating a frame comprising first information indicating a plurality of channels to be used by the apparatus for a transmission and second information indicating a time duration of the transmission. The apparatus also comprises means for outputting the frame for wireless transmission on at least one of the plurality of channels.

A fourth aspect relates to a computer-readable medium. The computer-readable medium comprises instructions stored thereon for generating a frame comprising first information indicating a plurality of channels to be used by an apparatus for a transmission and second information indicating a time duration of the transmission. The computer-readable medium also comprises instructions stored thereon for outputting the frame for wireless transmission on at least one of the plurality of channels.

A fifth aspect relates to a wireless node. The wireless node comprises at least one antenna, and a processing system configured to generate a frame comprising first information indicating a plurality of channels to be used by the wireless node for a transmission and second information indicating a time duration of the transmission. The wireless node also comprises a transmitter configured to transmit, via the at least one antenna, the frame.

A sixth aspect relates to an apparatus for wireless communications. The apparatus comprises an interface to receive a frame comprising first information indicating a plurality of channels to be used by another apparatus for a transmission and second information indicating a time duration of the transmission. The apparatus also comprises a processing system configured to determine the plurality of channels based on the first information, to compute a time duration based on the second information, and to prevent the apparatus from transmitting on the plurality of channels for at least the computed time duration.

A seventh aspect relates to a method for wireless communications. The method comprises receiving, at an apparatus, a frame comprising first information indicating a plurality of channels to be used by another apparatus for a transmission and second information indicating a time duration of the transmission. The method also comprises determining the plurality of channels based on the first information, computing a time duration based on the second information, and preventing the apparatus from transmitting on the plurality of channels for at least during the computed time duration.

An eighth aspect relates to an apparatus for wireless communications. The apparatus comprises means for receiving a frame comprising first information indicating a plurality of channels to be used by another apparatus for a transmission and second information indicating a time duration of the transmission. The apparatus also comprises means for determining the plurality of channels based on the first information, means for computing a time duration based on the second information, and means for preventing the apparatus from transmitting on the plurality of channels for at least during the computed time duration.

A ninth aspect relates to a computer-readable medium. The computer-readable medium comprises instructions stored thereon for receiving, at an apparatus, a frame comprising first information indicating a plurality of channels to be used by another apparatus for a transmission and second information indicating a time duration of the transmission. The computer-readable medium also comprises instructions stored thereon for determining the plurality of channels based on the first information, computing a time duration based on the second information, and preventing the apparatus from transmitting on the plurality of channels for at least during the computed time duration.

A tenth aspect relates to a wireless node. The wireless node comprises at least one antenna, and a receiver configured to receive, via the at least one antenna, a frame comprising first information indicating a plurality of channels to be used by an apparatus for a transmission and second information indicating a time duration of the transmission. The wireless node also comprises a processing system configured to determine the plurality of channels based on the first information, to compute a time duration based on the second information, and to prevent the wireless node from transmitting on the plurality of channels for at least during the computed time duration.

BRIEF DESCRIPTION OF THE DRAWINGS

FIG. 4 is a table showing exemplary fields in a header in accordance with certain aspects of the present disclosure.

DETAILED DESCRIPTION

Figure 1:
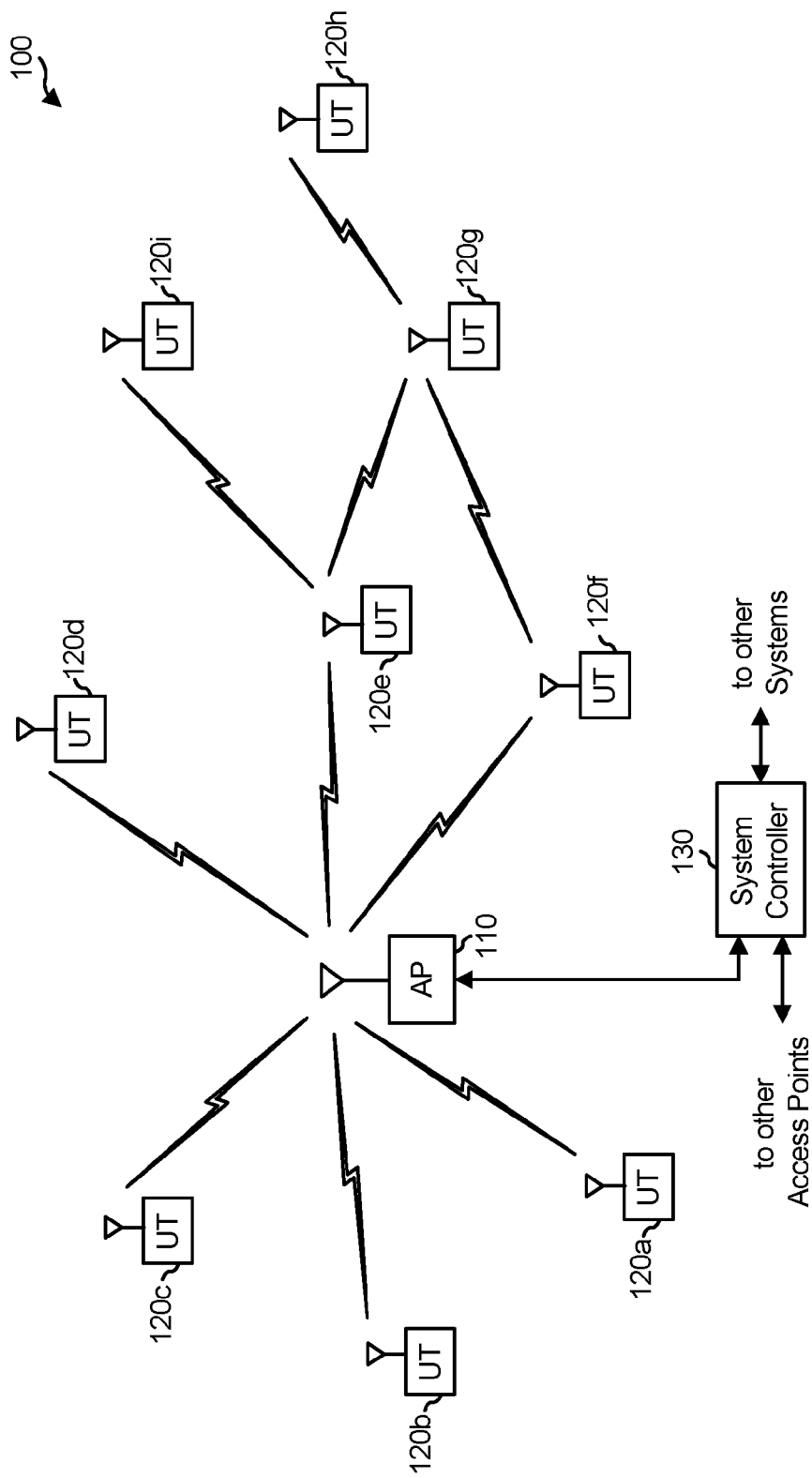
FIG. 1 illustrates an exemplary wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple access terminals. A TDMA system may allow multiple access terminals to share the same frequency channel by dividing the transmission signal into different time slots, each time slot being assigned to different access terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates an example of a wireless communication system 100 with access points and access terminals. For simplicity, only one access point 110 is shown in FIG. 1. An access point is generally a fixed station that communicates with the access terminals and may also be referred to as a base station or some other terminology. An access terminal may be fixed or mobile and may also be referred to as a mobile station, a wireless device or some other terminology. Access point 110 may communicate with one or more access terminals 120 at any given moment on the downlink and uplink. The downlink (i.e., forward link) is the communication link from the access point to the access terminals, and the uplink (i.e., reverse link) is the communication link from the access terminals to the access point. An access terminal may also communicate peer-to-peer with another access terminal. A system controller 130 couples to and provides coordination and control for the access points.

Figure 2:
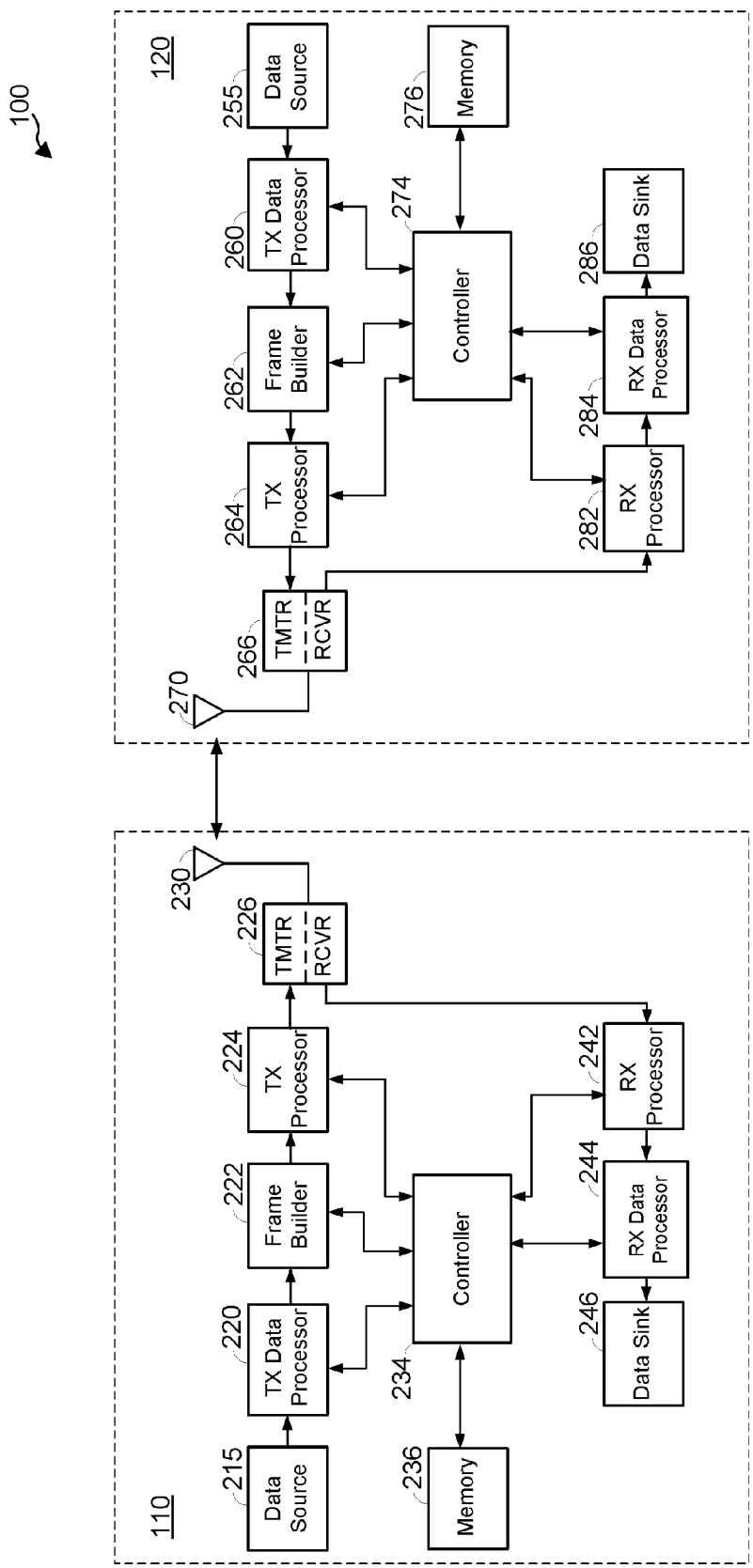
FIG. 2 is a block diagram of an exemplary access point and access terminal in accordance with certain aspects of the present disclosure.

FIG. 2 illustrates a block diagram of an access point 110 and an access terminal 120 in the wireless communication system 100. The access point 110 is a transmitting entity for the downlink and a receiving entity for the uplink. The access terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel.

For transmitting data, the access point 110 comprises a transmit data processor 220, a frame builder 222, a transmit processor 224, a transceiver 226, and one or more antennas 230 (for simplicity one antenna is shown). The access point 110 also comprises a controller 234 for controlling operations of the access point 110, as discussed further below.

In operation, the transmit data processor 220 receives data (e.g., data bits) from a data source 215, and processes the data for transmission. For example, the transmit data processor 220 may encode the data (e.g., data bits) into encoded data, and modulate the encoded data into data symbols. The transmit data processor 220 may support different modulation and coding schemes (MCSs). For example, the transmit data processor 220 may encode the data (e.g., using low-density parity check (LDPC) encoding) at any one of a plurality of different coding rates. Also, the transmit data processor 220 may modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 234 may send a command to the transmit data processor 220 specifying which modulation and coding scheme (MCS) to use (e.g., based on channel conditions of the downlink), and the transmit data processor 220 may encode and modulate data from the data source 215 according to the specified MCS. It is to be appreciated that the transmit data processor 220 may perform additional processing on the data such as data scrambling, and/or other processing. The transmit data processor 220 outputs the data symbols to the frame builder 222.

The frame builder 222 constructs a frame (also referred to as a packet), and inserts the data symbols into a data payload of the frame. The frame may include a preamble, a header, and the data payload. The preamble may include a short training field (STF) sequence and a channel estimation (CE) sequence to assist the access terminal 120 in receiving the frame, as discussed further below. The header may include information related to the data in the payload such as the length of the data and the MCS used to encode and modulate the data. This information allows the access terminal 120 to demodulate and decode the data. The data in the payload may be divided among a plurality of blocks where each block may include a portion of the data and a guard interval (GI) to assist the receiver with phase tracking. The frame builder 222 outputs the frame to the transmit processor 224.

The transmit processor 224 processes the frame for transmission on the downlink. For example, the transmit processor 224 may support different transmission modes such as an orthogonal frequency-division multiplexing (OFDM) transmission mode and a single-carrier (SC) transmission mode. In this example, the controller 234 may send a command to the transmit processor 224 specifying which transmission mode to use, and the transmit processor 224 may process the frame for transmission according to the specified transmission mode.

The transceiver 226 receives and processes (e.g., converts to analog, amplifies, filters, and frequency upconverts) the output of the transmit processor 224 for transmission via the one or more antennas 230. For example, the transceiver 226 may upconvert the output of the transmit processor 224 to a transmit signal have a frequency in the 60 GHz range.

In certain aspects, the transmit processor 224 may support multiple-output-multiple-input (MIMO) transmission. In these aspects, the access point 110 may include multiple antennas 230 and multiple transceivers 226 (e.g., one for each antenna). The transmit processor 224 may perform spatial processing on the incoming data symbols and provide a plurality of transmit symbol streams for the plurality of antennas 230. The transceivers 226 receive and process (e.g., converts to analog, amplifies, filters, and frequency upconverts) the respective transmit symbol streams to generate transmit signals for transmission via the antennas 230.

For transmitting data, the access terminal 120 comprises a transmit data processor 260, a frame builder 262, a transmit processor 264, a transceiver 266, and one or more antennas 270 (for simplicity one antenna is shown). The access terminal 120 may transmit data to the access point 110 on the uplink, and/or transmit data to another access terminal (e.g., for peer-to-peer communication). The access terminal 120 also comprises a controller 274 for controlling operations of the access terminal 120, as discussed further below.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 274 may send a command to the transmit data processor 260 specifying which MCS to use (e.g., based on channel conditions of the uplink), and the transmit data processor 260 may encode and modulate data from the data source 255 according to the specified MCS. It is to be appreciated that the transmit data processor may perform additional processing on the data. The transmit data processor 260 outputs the data symbols to the frame builder 262.

The frame builder 262 constructs a frame, and inserts the received data symbols into a data payload of the frame. The frame may include a preamble, a header, and the data payload. The preamble may include an STF sequence and a CE sequence to assist the access point 110 and/or another access terminal in receiving the frame, as discussed further below. The header may include information related to the data in the payload such as the length of the data and the MCS used to encode and modulate the data. The data in the payload may be divided among a plurality of blocks where each block may include a portion of the data and a guard interval (GI) to assist the access point and/or another access terminal with phase tracking, as discussed further below. The frame builder 262 outputs the frame to the transmit processor 264.

The transmit processor 264 processes the frame for transmission. For example, the transmit processor 264 may support different transmission modes such as an OFDM transmission mode and an SC transmission mode. In this example, the controller 274 may send a command to the transmit processor 264 specifying which transmission mode to use, and the transmit processor 264 may process the frame for transmission according to the specified transmission mode.

The transceiver 266 receives and processes (e.g., converts to analog, amplifies, filters, and frequency upconverts) the output of the transmit processor 264 for transmission via the one or more antennas 270. For example, the transceiver 266 may upconvert the output of the transmit processor 264 to a transmit signal have a frequency in the 60 GHz range.

In certain aspects, the transmit processor 264 may support multiple-output-multiple-input (MIMO) transmission. In these aspects, the access terminal 120 may include multiple antennas 270 and multiple transceivers 266 (e.g., one for each antenna). The transmit processor 264 may perform spatial processing on the incoming data symbols and provide a plurality of transmit symbol streams for the plurality of antennas 270. The transceivers 266 receive and process (e.g., converts to analog, amplifies, filters, and frequency upconverts) the respective transmit symbol streams to generate transmit signals for transmission via the antennas 270.

For receiving data, the access point 110 comprises a receive processor 242, and a receive data processor 244. In operation, the transceiver 226 receives a signal (e.g., from the access terminal 120), and processes (e.g., frequency downconverts, amplifies, filters and converts to digital) the received signal.

The receive processor 242 receives the output of the transceiver 226, and processes the output to recover data symbols. For example, the access point 110 may receive data (e.g., from the access terminal 120) in a frame, as discussed above. In this example, the receive processor 242 may detect the start of the frame using the STF sequence in the preamble of the frame. The receive processor 242 may also use the STF for automatic gain control (AGC) adjustment. The receive processor 242 may also perform channel estimation (e.g., using the CE sequence in the preamble of the frame) and perform channel equalization on the received signal based on the channel estimation. Further, the receive processor 242 may estimate phase using the guard intervals (GIs) in the payload, and reduce phase noise in the received signal based on the estimated phase, as discussed further below. The phase noise may be due to noise from a local oscillator in the access terminal 120 and/or noise from a local oscillator in the access point 110 used for frequency conversion. The phase noise may also include noise from the channel. The receive processor 242 may also recover information (e.g., MCS scheme) from the header of the frame, and send the information to the controller 234. After performing channel equalization and/or phase noise reduction, the receive processor 242 may recover data symbols from the frame, and output the recovered data symbols to the receive data processor 244 for further processing, as discussed further below.

The receive data processor 244 receives the data symbols from the receive processor 242 and an indication of the corresponding MCS scheme from the controller 234. The receive data processor 244 demodulates and decodes the data symbols to recover the data according to the indicated MCS scheme, and outputs the recovered data (e.g., data bits) to a data sink 246 for storage and/or further processing.

As discussed above, the access terminal 120 may transmit data using an OFDM transmission mode or a SC transmission mode. In this case, the receive processor 242 may process the receive signal according to the selected transmission mode. Also, as discussed above, the transmit processor 264 may support multiple-output-multiple-input (MIMO) transmission. In this case, the access point 110 may include multiple antennas 230 and multiple transceivers 226 (e.g., one for each antenna). Each transceiver 226 receives and processes (e.g., frequency downcoverts, amplifies, filters, converts to digital) the signal from the respective antenna 230. The receive processor 242 may perform spatial processing on the outputs of the transceivers to recover the data symbols.

For receiving data, the access terminal 120 comprises a receive processor 282, and a receive data processor 284. In operation, the transceiver 266 receives a signal (e.g., from the access point 110 or another access terminal), and processes (e.g., frequency downconverts, amplifies, filters and converts to digital) the received signal.

The receive processor 282 receives the output of the transceiver 266, and processes the output to recover data symbols. For example, the access terminal 120 may receive data (e.g., from the access point 110 or another access terminal) in a frame, as discussed above. In this example, the receive processor 282 may detect the start of the frame using the STF sequence in the preamble of the frame. The receive processor 282 may also perform channel estimation (e.g., using the CE sequence in the preamble of the frame) and perform channel equalization on the received signal based on the channel estimation. Further, the receive processor 282 may estimate phase using the guard intervals (GIs) in the payload, and reduce phase noise in the received signal based on the estimated phase, as discussed further below. The receive processor 282 may also recover information (e.g., MCS scheme) from the header of the frame, and send the information to the controller 274. After performing channel equalization and/or phase noise reduction, the receive processor 282 may recover data symbols from the frame, and output the recovered data symbols to the receive data processor 284 for further processing, as discussed further below.

The receive data processor 284 receives the data symbols from the receive processor 282 and an indication of the corresponding MCS scheme from the controller 274. The receive data processor 284 demodulates and decodes the data symbols to recover the data according to the indicated MCS scheme, and outputs the recovered data (e.g., data bits) to a data sink 286 for storage and/or further processing.

As discussed above, the access point 110 or another access terminal may transmit data using an OFDM transmission mode or a SC transmission mode. In this case, the receive processor 282 may process the receive signal according to the selected transmission mode. Also, as discussed above, the transmit processor 224 may support multiple-output-multiple-input (MIMO) transmission. In this case, the access terminal 120 may include multiple antennas 270 and multiple transceivers 266 (e.g., one for each antenna). Each transceiver 266 receives and processes (e.g., frequency downcoverts, amplifies, filters, converts to digital) the signal from the respective antenna 270. The receive processor 282 may perform spatial processing on the outputs of the transceivers to recover the data symbols.

As shown in FIG. 2, the access point 110 also comprises a memory 236 coupled to the controller 234. The memory 236 may store instructions that, when executed by the controller 234, cause the controller 234 to perform one or more of the operations described herein. Similarly, the access terminal 120 also comprises a memory 276 coupled to the controller 274. The memory 276 may store instructions that, when executed by the controller 274, cause the controller 274 to perform the one or more of the operations described herein.

Figure 3:
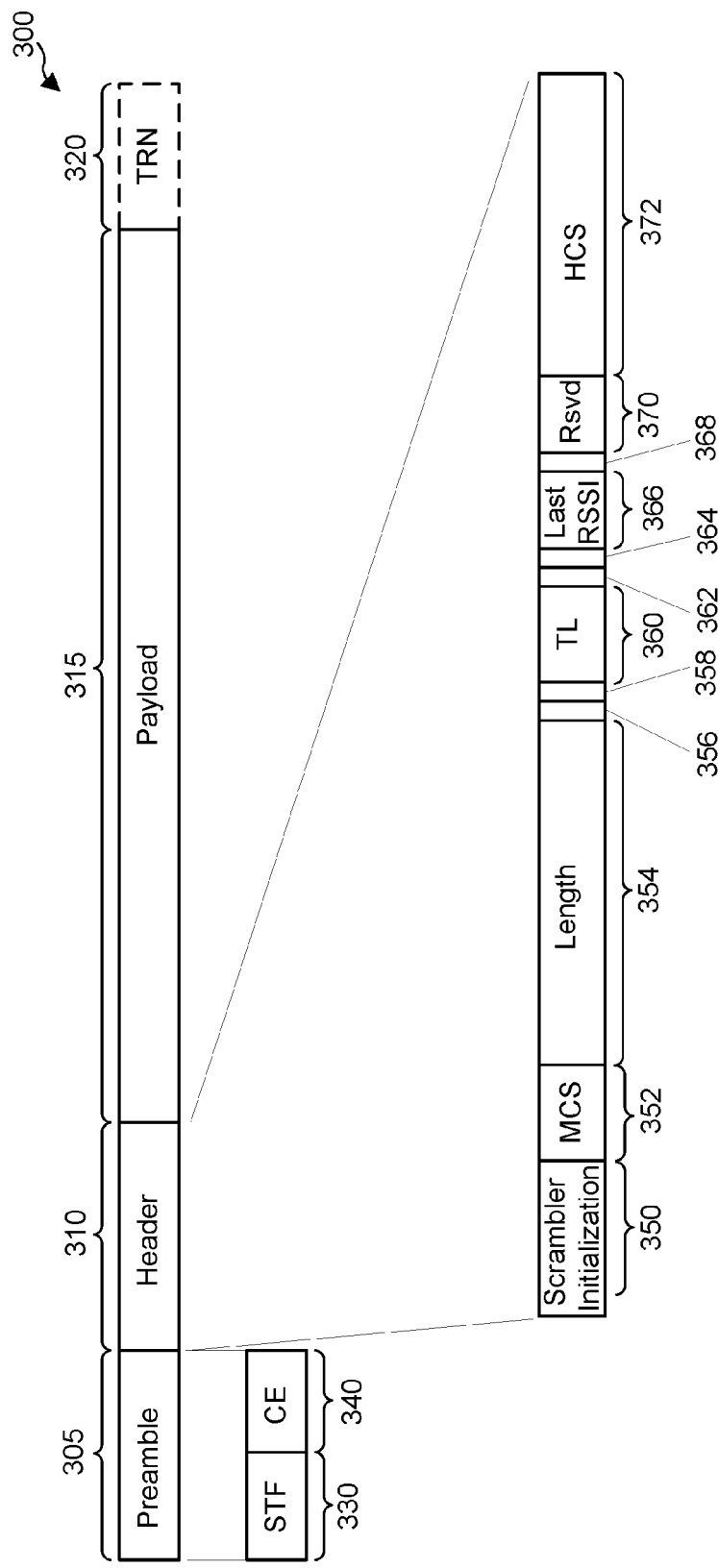
FIG. 3 illustrates an exemplary frame structure in accordance with certain aspects of the present disclosure.

FIG. 3 shows an exemplary frame structure 300 in accordance with certain aspects of the present disclosure. The frame 300 comprises a preamble 305, a header 310, a payload 315, and an optional beamforming training field 320. It is to be appreciated that the frame 300 may comprise additional fields. The preamble 305 may comprise a short training field (STF) sequence 330 and a channel estimation (CE) sequence 340. The STF sequence may assist a receiver in performing automatic gain control (AGC), time synchronization, and frequency offset cancellation for accurately receiving the rest of the frame and possibly subsequent frames. For example, the STF sequence may include a plurality of Golay sequences ($Ga_{128}$) and a negative Golay sequence ($-Ga_{128}$) to signify the end of the STF sequence. It is to be appreciated that the STF sequence 330 is not limited to this example, and that other Golay sequences may be used.

The CE sequence 340 may assist the receiver in performing channel estimation. In this regard, the CE sequence 340 may comprise Golay sequences. For example, for the SC transmission mode, the CE sequence may include a $Gu_{512}$ sequence (consisting of the following concatenated Golay sequences ($-Gb_{128}$, $-Ga_{128}$, $Gb_{128}$, $-Ga_{128}$) followed by a $Gv_{512}$ sequence (consisting of the following concatenated Golay sequences ($-Gb_{128}$, $Ga_{128}$, $-G_{128}$, $-Ga_{128}$), and ending with a $Gv_{128}$ sequence (same as $-Gb_{128}$). For the OFDM transmission mode, the CE sequence may include a $Gv_{512}$ sequence followed by a $Gu_{512}$ sequence, and ending with a $Gv_{128}$ sequence. It is to be appreciated that the CE sequence 340 is not limited to the above examples, and that other Golay sequences may be used for the CE sequence 340.

The header 310 includes various information about the frame. FIG. 3 shows an example of a header 310 used in an IEEE 802.11ad standard for WLAN in the 60 GHz range. However, it is to be appreciated that aspects of the present disclosure are not limited to this example. In this example, the header 310 includes a scrambler initialization field 350, a modulation and coding scheme (MCS) field 352, a length field 354, an additional PPDU field 356, a packet type field 358, a training length field 360, an aggregation field 362, a beam tracking request field 364, a last RSSI field 366, a turnaround field 368, a reserved field 370, and a head check sequence (HCS) field 372. Some of the fields are described further below.

The scrambler initialization field 350 indicates an initial scrambler state. The MCS field 352 indicates a MCS used to modulate and encode the data in the payload 315. The length field 354 indicates the amount of data (e.g., in octets) in the payload 315. As discussed further below, the length field 354 may also be used by a non-target receiver to compute a network allocation vector (NAV) for collision avoidance purposes. The training length field 360 indicates the length of the optional beamforming training field 320. The beamforming training field 320 may include beam-forming information if beam steering is used at the transmitter to direct the transmitted signal to the receiver. The last RSSI field 366 includes a copy of the parameter LAST_RSSI from the TXVECTOR. The reserved field 370 includes reserves bits (e.g., four bits) in the header 310 for future use. The HCS field 372 provides a checksum for the header bits. Table in FIG. 4 provides examples of the start bit and number of bits for each field of the header 310.

The payload 315 is divided into a plurality of blocks. Each block comprises a guard interval (GI) and a portion of the data in the payload 315. The GI in each block comprises a reference that is known a priori by the receiver for assisting the receiver with phase tracking. The GI may also be used for frequency domain equalization.

As discussed above, FIG. 3 shows an example of a frame structure according to the IEEE 802.11ad standard. An IEEE 802.11ay standard, which is the successor to the IEEE 802.11ad standard, is being developed to increase throughput using channel bonding (CB) with higher symbol rates and higher constellations. In the IEEE 802.11 ad, a transmitter transmits data on one of four channels in the 60 GHz band. IEEE 802.11ay will support channel bonding (CB), which allows a receiver to transmit data over two or more channels bonded together for increased throughput. This transmission may use any defined modulation: OFDM, wideband single carrier (SC), aggregate SC or duplicate. In CB, the transmission starts and ends at the same time on all bonded channels, up to a given delay that might be used, that is small relative to protocol PHY timeouts (e.g., SIFS). All transmissions in CB mode (two or more channels) may start with STF+CE+Header on each channel. These are transmissions that may be 802.11ad compatible transmissions so that any 802.11ad receiver and any 802.11ay receiver tuned to any of the bonded channels can decode the header given that the signal arrives with enough power at the receiver. Additional details may be found, for example, in U.S. Provisional Application No. 62/147,479 filed on Apr. 14, 2015, the entire specification of which is incorporated herein by reference.

Figure 5A:
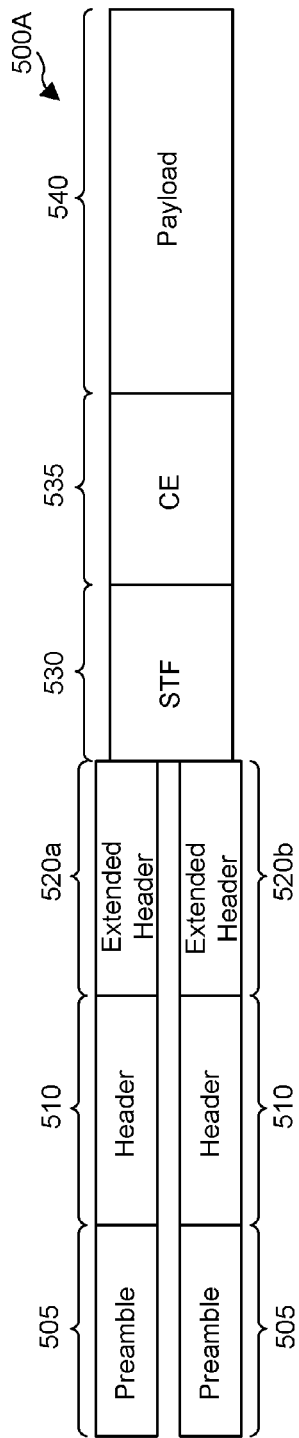
FIG. 5A illustrates an exemplary frame structure for channel bonding in accordance with certain aspects of the present disclosure.

FIG. 5A shows an exemplary frame structure 500A for transmitting data on a first channel and a second channel using channel bonding. As discussed further below, the frame structure may be extended to three-channel bonding, four-channel bonding, etc. In this example, the frame 500A may include a preamble 505 and a header 510 redundantly transmitted on the first and second channels, as shown in FIG. 5A. Each of the channels may have a bandwidth of 1.76 GHz or another bandwidth. In some aspects, the basic structure of the preamble 505 and header 510 may be in accordance with the IEEE 802.11 ad standard in order to be backwards compliant. This allows an 802.11ad receiver (referred to as a "legacy" receiver herein) to listen to the first channel or the second channel to decode all or a portion of the header 510 (e.g., for collision avoidance purposes), as discussed further below. In addition, 802.11ay receivers can decode the header 510. The header 510 may be modulated and encoded using a low MCS (e.g., the MCS specified in the 802.11ad standard for the header) to provide a robust transmission for reception by in-range 802.11ad and 802.11ay receivers.

The frame structure 500A may also include an extended header 520*a* transmitted on the first channel and an extended header 520*b* transmitted on the second channel. The extended headers 520*a* and 520*b* may specify transmission parameters for the bonded channels (e.g., MCS, data length, transmission mode, etc.). In some aspects the extended headers 520*a* and 520*b* are intended for the target receiver (destination receiver), and may therefore be modulated and encoded using a higher MCS than the header 510 for higher efficiency. Additional details on the extended headers may be found, for example, in U.S. Provisional Application No. 62/147,479 discussed above.

The frame structure 500A also comprises an STF field 530, a CE field 535, and a payload 540 transmitted on the bonded channels, for example, in a wideband single carrier (SC) transmission mode. The STF field 530 may include one or more Golay sequences to assist the target receiver (e.g., 802.11ay receiver) with automatic gain control (AGC), time synchronization, and frequency acquisition. The CE field 535 may include one or more Golay sequences to assist the target receiver (e.g., 802.11ay receiver) with channel estimation. The payload 540 includes the data transmitted on the bonded channels. The data may be modulated using any one of a plurality of MCSs including, but not limited to, BPSK, QPSK, 16QAM, 64QAM, 64APSK, 128APSK, 256QAM and 256APSK. Additional details on the STF field 530, the CE field 535 and payload 540 may be found, for example, in U.S. Provisional Application No. 62/147,479 discussed above.

Figure 5B:
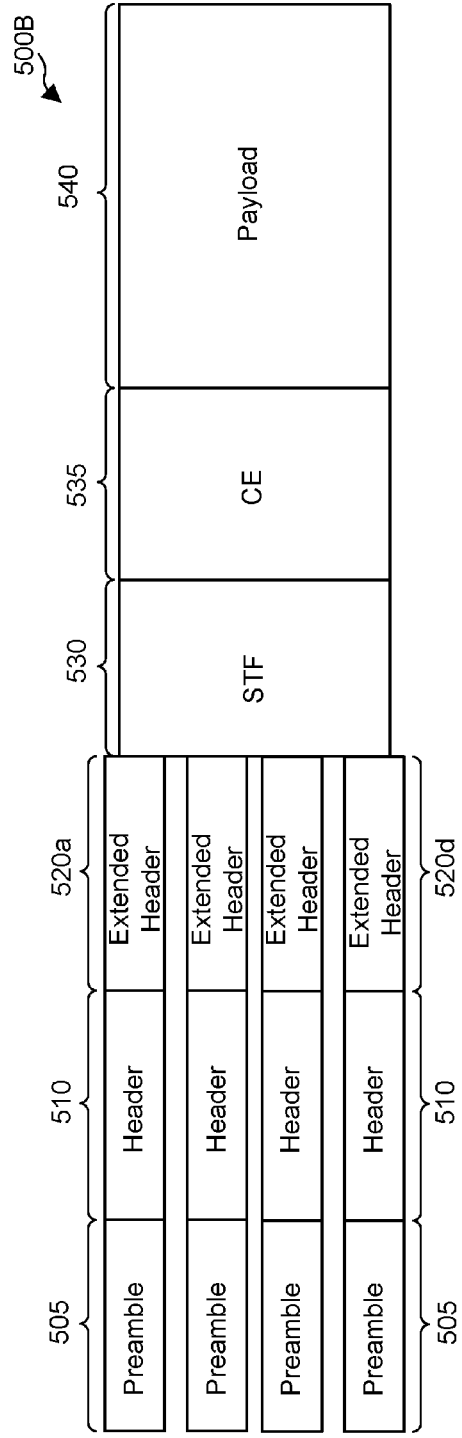
FIG. 5B illustrates an extension of the frame structure in FIG. 5A for bonding four channels in accordance with certain aspects of the present disclosure.

FIG. 5A shows an exemplary frame structure 500A for two-channel bonding. However, it is to be appreciated that the present disclosure is not limited to this example, and that the frame structure 500A may be extended to three-channel bonding, four-channel bonding, etc. In this regard, FIG. 5B shows a frame structure 500B for four-channel bonding that is an extension of the frame structure 500A in FIG. 5A. As shown in FIG. 5B, the preamble 505 and header 510 (e.g., legacy 802.11ad preamble and header) may be redundantly transmitted on four channels, and the payload 540 may be transmitted over the four channels using channel bonding. Additional examples of frame formats suitable for channel bonding may be found, for example, in U.S. Provisional Application No. 62/147,479 discussed above.

A collision may occur in a wireless communication system when two or more wireless nodes in close proximity transmit on the same channel at the same time. In order to avoid such a collision, a wireless node that wants to use one or more channels needs to have as much information as possible about medium use in the wireless communication system (e.g., determine whether a channel is free or being used by another wireless node). On the other hand, a wireless node may want to be in sleep mode as much as possible to save power. Due to these competing concerns, a wireless node may stay in the sleep mode to save power and wake up from the sleep when the wireless node needs information about medium utilization and medium availability in the wireless communication system. The wireless node may be an access terminal 120 or an access point 110.

In a first approach, a pair of wireless nodes may exchange request to send (RTS) and clear to send (CTS) messages during a handshake procedure when one of the wireless nodes want to transmit data to the other wireless node. The RTS and CTS may include information indicating one or more channels to be used for the transmission and the duration of the transmission (e.g., TXOP duration). A third wireless node (e.g., AP or AT) in the system may receive the RTS and/or CTS and determine that the one or more channels indicated in the RTS and/or CTS are occupied (reserved). The third wireless node may also determine the duration (e.g., TXOP duration) that the one or more channels will be used from the RTS and/or CTS. The third wireless node may then avoid transmitting on the one or more channels for the determined duration to avoid collision. A problem with this approach is that the chances that the third wireless node will be on when the RTS and/or CTS are transmitted (and therefore the chances that the third wireless node will receive the RTS and/or CTS) may be low.

In a second approach, a wireless node may perform measurements on one or more channels to sense (detect) transmissions by other wireless nodes on the one or more channels. However, a problem with this approach is that the sensitivity of this sensing is low. Receivers are required to detect transmissions that are 20 dB or more above the actual receiver sensitivity at lowest MCS (transmission mode: includes modulation and coding). Hence, there is a gap of at least 20 dB where signals interfere but are not detected using this approach.

In a third approach, a wireless node listens to a channel for a monitoring period to determine whether the channel is free (clear). While listening to the channel, the wireless node may encounter the start of a frame (a TXOP usually consists of many frames, usually separated by a small period (e.g., SIFS)) transmitted by another wireless node on the channel. The wireless node can decode the header and get the medium utilization of this channel for this frame. The header receive sensitivity is very good (e.g., significantly better than any payload MCS). For example, the wireless node may determine the transmission duration for the frame from the length field of the header, and therefore determine for how much time the channel will be used. The wireless node may then decide to go to sleep for the transmission duration and/or try a different channel. After the frame ends, if TXOP is not completed yet, the next frame will start. In this case, the wireless node may determine the transmission duration of the next frame from the header in the next frame, and go back to sleep for the duration of the next frame, and so on. Please note that the header discussed above is the legacy 802.11ad header and has information only about its channel.

A challenge facing 802.11ay communication is improving the ability of an 80.211ay wireless node to detect transmissions.

A second issue is that an 802.11ay wireless node usually camps on one channel (the "primary" channel). Before transmitting, the wireless node may listen to all channels it intends to use, but has no information about the other channels. Requiring the wireless node to listen to all channels to see which ones are free may require special hardware, special capabilities and consumes significant power.

To address the above, channel bonding (CB) information may be included in a frame (e.g., legacy header of the frame), where the CB information indicates all of the channels on which the frame is transmitted according to certain aspects. A wireless node may receive the CB information on one of the channels. This allows the wireless node to understand all of the channels that are going to be used (and therefore avoid collision on all of the channels) even if the wireless node is not tuned to all of these channels.

In certain aspects, the CB information may be included in the extended header 520 of a frame (e.g., frame 500A or 500B). However, the extended header 520 may be mainly intended for the receiver to which the frame is addressed (target receiver). If the link between the transmitter and the target receiver is good or very good, the extended header can be transmitted at a higher MCS for efficiency. However, the higher the MCS, the more difficult it is for neighboring wireless nodes (non-target wireless nodes) that try to sense the medium and may have less favorable channel conditions to receive the CB information. Therefore, it may be desirable to use a low MCS for the CB information to facilitate reception by neighboring wireless node for collision avoidance purposes.

To address this, in certain aspects, the CB information is included in the legacy header (e.g., header 310 or 510) in such a way that it does not interfere with the operation of 802.11ad wireless nodes. Since the legacy header uses a low MCS, placing the CB information in the legacy header allows an 802.11ay wireless node to receive the CB information with excellent sensitivity. In addition, this approach does not require the extended header 520 to use a low MCS, which would reduce the efficiency of the extended header 520.

Furthermore, the header (e.g., header 310 or 510) may be redundantly transmitted on each channel that is being used. This allows a wireless node that is only tuned to one of the channels to receive the CB information and hence determine not only that this channel is being used, but also determine all channels that are going to be used. At this point, the wireless node may choose to switch to one of the channels that is not included in the CB and try to use it (the wireless node may still have to perform a full monitoring period to check that the channel is free).

In certain aspects, the CB information may comprise two portions in which the first portion indicates the first one of the bonded channels and the second portion indicates the number of bonded channels. Together, the first and second portions of the CB information provide enough information for a receiver to determine the bonded channels, assuming the bonded channels are contiguous.

In one example, a transmitter may transmit on up to four channels (labeled 1 to 4). In this example, the first portion of the CB information comprises two bits to specify the index of the first (least index) channel in the bonding set. The first portion is denoted CB_first. The second portion comprises two bits to specify the length of the CB (1 . . . 4). The value of 1 is required since a transmission may use only one channel without bonding. The second portion is denoted by CB_size.

Table 1 below shows an example of encoding for the CB_first.

TABLE 1

| CB_first | Bits coding |
| --- | --- |
| Channel 1 | 00 |
| Channel 2 | 01 |
| Channel 3 | 10 |
| Channel 4 | 11 |

Table 2 below shows an example of encoding for the CB_size.

TABLE 2

| CB_size | Bits coding |
| --- | --- |
| 1 channel | 00 |
| 2 channels | 01 |
| 3 channels | 10 |
| 4 channels | 11 |

In another example, a transmitter may transmit on up to eight channels (labeled 1 to 8). In this example, the first portion of the CB information comprises three bits to specify the index of the first (least index) channel in the bonding set. The first portion is denoted CB_first. The second portion comprises three bits to specify the length of the CB (1 . . . 4). The value of 1 is required since a transmission may use only one channel without bonding. The second portion is denoted by CB_size.

Table 3 below shows an example of encoding for the CB_first.

TABLE 3

| CB_first | Bits coding |
| --- | --- |
| Channel 1 | 000 |
| Channel 2 | 001 |
| Channel 3 | 010 |
| Channel 4 | 011 |
| Channel 5 | 100 |
| Channel 6 | 101 |
| Channel 7 | 110 |
| Channel 8 | 111 |

Table 4 below shows an example of encoding for the CB_size.

TABLE 4

| CB_size | Bits coding |
| --- | --- |
| 1 channel | 000 |
| 2 channels | 001 |
| 3 channels | 010 |
| 4 channels | 011 |
| 5 channels | 100 |
| 6 channels | 101 |
| 7 channels | 110 |
| 8 channels | 111 |

Various aspects for placing the CB information in a single carrier (SC) legacy header will now be described.

In certain aspects, the CB information for up to four channels may be placed (inserted) in the legacy header (e.g., header 310 or 510) using one of two exemplary options. In the first option, the CB information is placed (inserted) in the reserved field 370, which may have four spare bits (44 . . . 47). In this option, all four spare bits may be used for the CB information.

In the second option, one of the first and second portions of the CB information is placed (inserted) in the reserved field 370, leaving two bits in the reserved field 370 for other purposes. The other one of the first and second portions of the CB information may be placed (inserted) in the two least significant bits of the length field 354 of the header. In an 802.11ay transmission, the length in the legacy header does not specify the 802.11ay payload length. Rather, the length is only used by a receiver to compute the NAV (duration of the transmission), as discussed further below. Since the transmission duration is quantized to FFT and LDPC blocks, the LSBs can be manipulated without changing the transmission length.

Figure 6:
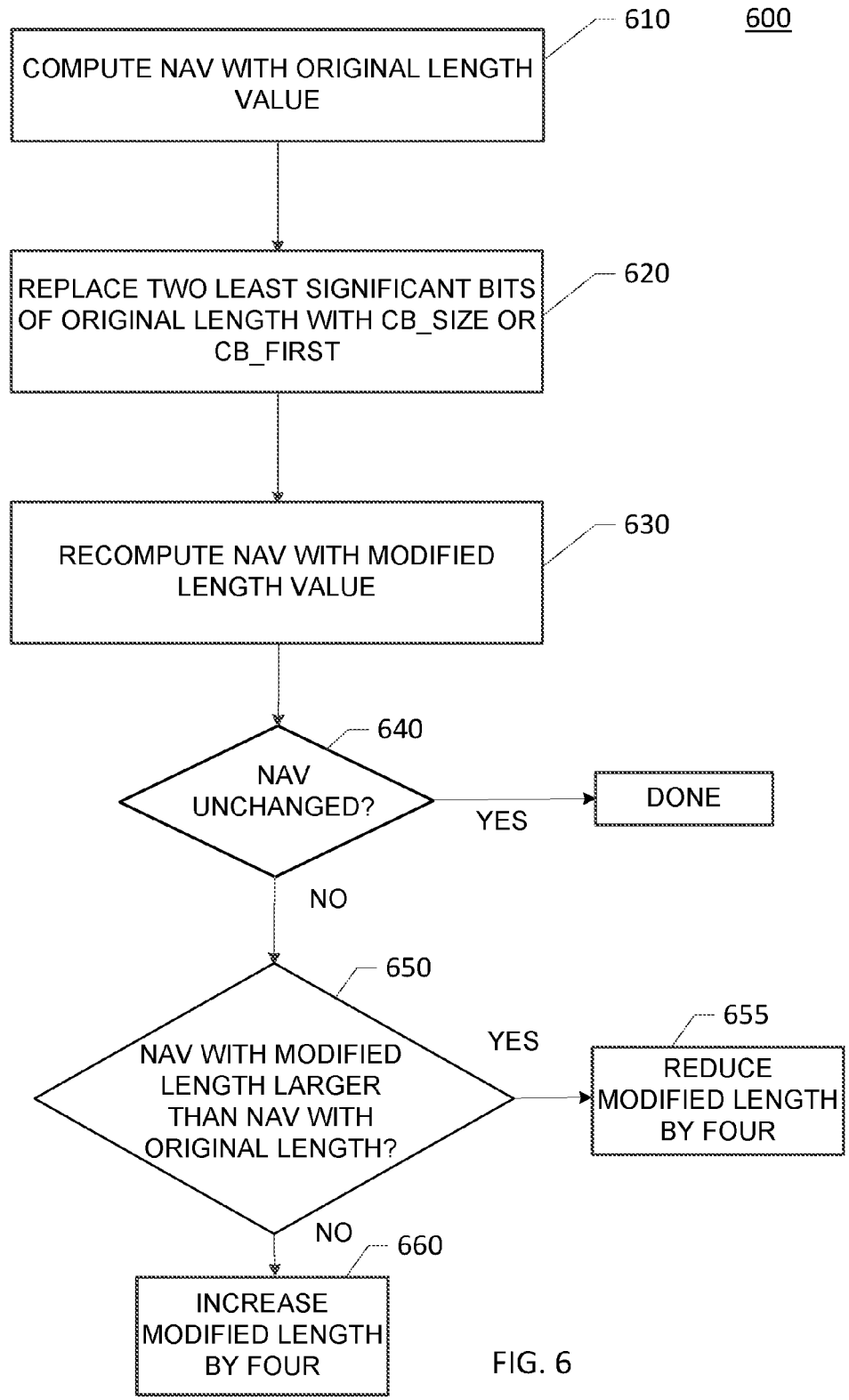
FIG. 6 is a flowchart illustrating an exemplary method for avoiding change in NAV computation in accordance with certain aspects of the present disclosure.

In certain aspects, the length field may require additional changes to avoid change in the NAV computation at a receiver. In this regard, FIG. 6 is a flow diagram illustrating a method 600 for avoiding change in the NAV computation at the receiver. The method 600 may be performed at the transmitter.

At 610, a NAV is computed with the original length value. The original length value is the length value without CB bits in the two LSBs of the length value.

At 620, the two LSBs of the original length value are replaced by one of the CB_size and CB_first. The other one of the CB_size and CB_first may be placed in the reserved field 370.

At 630, the NAV is recomputed with the modified length value. This may be done to determine the impact of the CB_size or CB_first on the NAV computation.

At 640, a determination is made whether the NAV is unchanged by the CB_size or CB_first. If the NAV is unchanged, then the operation may be done. In this case, the modified length value may be placed in the length field 354 of the header (e.g., header 310 or 510) to provide both the duration of the transmission and the CB_size or CB_first.

At 650, a determination is made whether the NAV in step 630 is larger than the NAV in step 610. If so, then the modified length value is reduced by four to obtain a second modified length value at 655. In this case, the second modified length value may be placed in the length field 354 of the header to provide both the duration of the transmission and the CB_size or CB_first.

If the NAV in step 630 is not larger than the NAV in step 610 (i.e., less than the NAV in step 610), then the modified length value is increased by four to obtain a second modified length value at 660. In this case, the second modified length value may be placed in the length field 354 of the header to provide both the duration of the transmission and the CB_size or CB_first.

It is to be appreciated that present disclosure is not limited to the order of the steps shown in the example in FIG. 6, and that the order of the steps may be changed. In other words, unless a specific order of steps is required for proper operation of the method 600, the order of the steps may be modified without departing from the scope of the present disclosure.

In certain aspects, the CB information for up to eight channels may be placed (inserted) in the legacy header. In these aspects, one of the first and second portions of the CB information is placed (inserted) in the reserved field 370, leaving one bit in the reserved field 370 for other purposes. The other one of the first and second portions of the CB information may be placed (inserted) in the three least significant bits of length field 354 of the header. For example, CB_size may be placed in bit locations 44, 45 and 46 of the reserved field and CB_first may be placed in the three LBSs of the length field 354, or vice versa.

In an 802.11ay transmission, the length in the legacy header does not specify the 802.11ay payload length. Rather, the length is only used by a receiver to compute the NAV (duration of the transmission), as discussed further below. Since the transmission duration is quantized to FFT and LDPC blocks, the LSBs can be manipulated without changing the transmission length.

Figure 7:
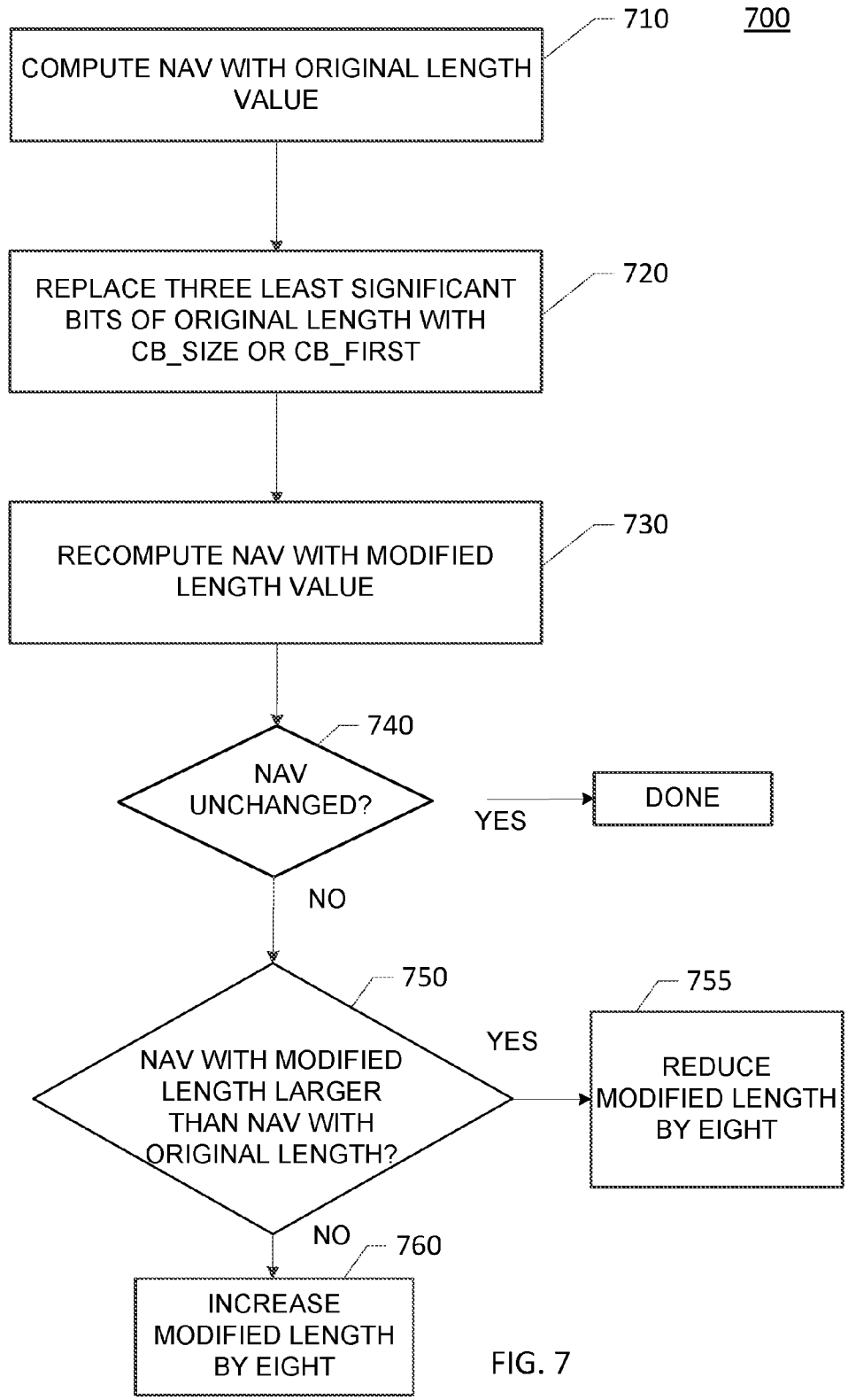
FIG. 7 is a flowchart illustrating another exemplary method for avoiding change in NAV computation in accordance with certain aspects of the present disclosure.

In certain aspects, the length field may require additional changes to avoid change in the NAV computation at a receiver. In this regard, FIG. 7 is a flow diagram illustrating a method 700 for avoiding change in the NAV computation at the receiver. The operations method may be performed at the transmitter.

At 710, a NAV is computed with the original length value. The original length value is the length value without CB bits in the three LSBs of the length value.

At 720, the three LSBs of the original length value are replaced by one of the CB_size and CB_first. The other one of the CB_size and CB_first may be placed in the reserved field 370.

At 730, the NAV is recomputed with the modified length value. This may be done to determine the impact of the CB_size or CB_first on the NAV computation.

At 740, a determination is made whether the NAV is unchanged by the CB_size or CB_first. If the NAV is unchanged, then the operation may be done. In this case, the modified length value may be placed in the length field 354 of the header (e.g., header 310 or 510) to provide both the duration of the transmission and the CB_size or CB_first.

At 750, a determination is made whether the NAV in step 730 is larger than the NAV in step 710. If so, then the modified length value is reduced by eight to obtain a second modified length value at 755. In this case, the second modified length value may be placed in the length field 354 of the header to provide both the duration of the transmission and the CB_size or CB_first.

If the NAV in step 730 is not larger than the NAV in step 710 (i.e., less than the NAV in step 710), then the modified length value is increased by eight to obtain a second modified length value at 760. In this case, the second modified length value may be placed in the length field 354 of the header to provide both the duration of the transmission and the CB_size or CB_first.

It is to be appreciated that present disclosure is not limited to the order of the steps shown in the example in FIG. 7, and that the order of the steps may be changed. In other words, unless a specific order of steps is required for proper operation of the method 700, the order of the steps may be modified without departing from the scope of the present disclosure.

It is to be appreciated that the present disclosure is not limited to the examples given above. For example, the CB bonding information may be encoded using four bits for up to four channels, where each bit indicates whether a corresponding channel is being used. In another example, the CB bonding information may be encoded using eight bits for up to eight channels, where each bit indicates whether a corresponding channel is being used. It is to also be appreciated that the CB bonding information may be split between the reserved field and the least significant bits of the length field 354 in different ways. For example, any one, two, three or four bits of the CB bonding information may be placed in the length field 354 with the remaining bits placed in the reserved field 370.

As discussed above, an 802.11ay wireless node may monitor a channel for a monitoring period to determine whether the channel is free (clear) before transmitting on the channel. If the wireless node receives the start of a frame from another wireless node during the monitoring period, the wireless node may retrieve the CB information from the header (e.g., header 310 or 510) to determine all of the channels used for the frame. The header may be a legacy header using a low MCS, which increases the likelihood the CB information will be received by neighboring wireless node. The wireless node may retrieve the CB information from the reserved field 370 of the header and/or least significant bits of the length field 354 of the header, as discussed above. The wireless node may then determine all of the channels for the frame based on the CB information. Thus, the wireless node may determine all of the channels for the frame by receiving the header on one of the channels.

The wireless node may also compute a NAV using the length value in the length field. For example, the wireless node may compute the NAV according to the 802.11 ad standard or another algorithm. The wireless node may determine that the channels indicated in the CB information are occupied (reserved) for the duration of the computed NAV. For example, the wireless node may update a NAV timer associated with the channels with the computed NAV. In this example, the wireless node may consider the channels occupied until the NAV timer counts down to zero. Thus, the wireless node may avoid using the channels (e.g., transmitting on the channels) for the duration of the NAV.

An 802.11ad wireless node may also monitor a channel for a monitoring period to determine whether the channel is free (clear) before transmitting on the channel. If the wireless node receives the start of a frame on the channel from another wireless node during the monitoring period, the wireless node may retrieve the length value from the length field 354 of the header (e.g., header 310 or 510) and compute a NAV value. The header may be a legacy header to allow the 802.11 ad wireless node to retrieve the length value. This allows the 802.11ad wireless node to know that the channel is going to be used by the other wireless node even if it cannot decode the data itself. After computing the NAV, the 802.11ad wireless node may avoid using the channel (i.e., channel on which the header was received) for the duration of the NAV.

In the above example, the 802.11ad wireless node may not be able to decode the CB information. Thus, the 802.11ad wireless node may only understand that the channel on which the header was received is being used. Alternatively, the 802.11 ad wireless node may be updated to understand the CB information in the header. In this case, the updated 802.11ad wireless node may determine all of the channels used for the frame based on the CB information, and avoid using all of the channels for the duration of the NAV.

Figure 8:
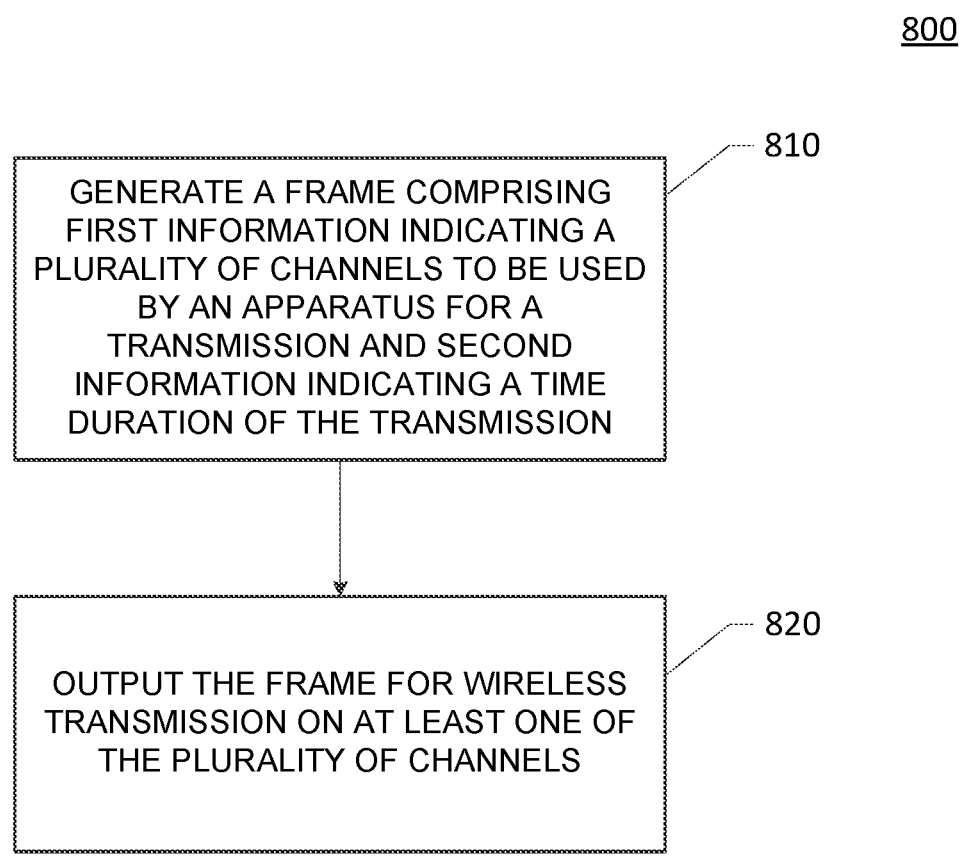
FIG. 8 is a flowchart of a method for wireless communications in accordance with certain aspects of the present disclosure.

FIG. 8 illustrates example operations 800 for wireless communication in accordance with certain aspects of the present disclosure. The operations 800 may be performed, for example, by a wireless node (e.g., an access point 110 or access terminal 120).

At 810, a frame is generated, the frame comprising first information indicating a plurality of channels to be used by an apparatus for a transmission and second information indicating a time duration of the transmission.

At 820, the frame is output for wireless transmission on at least one of the plurality of channels.

Figure 9:
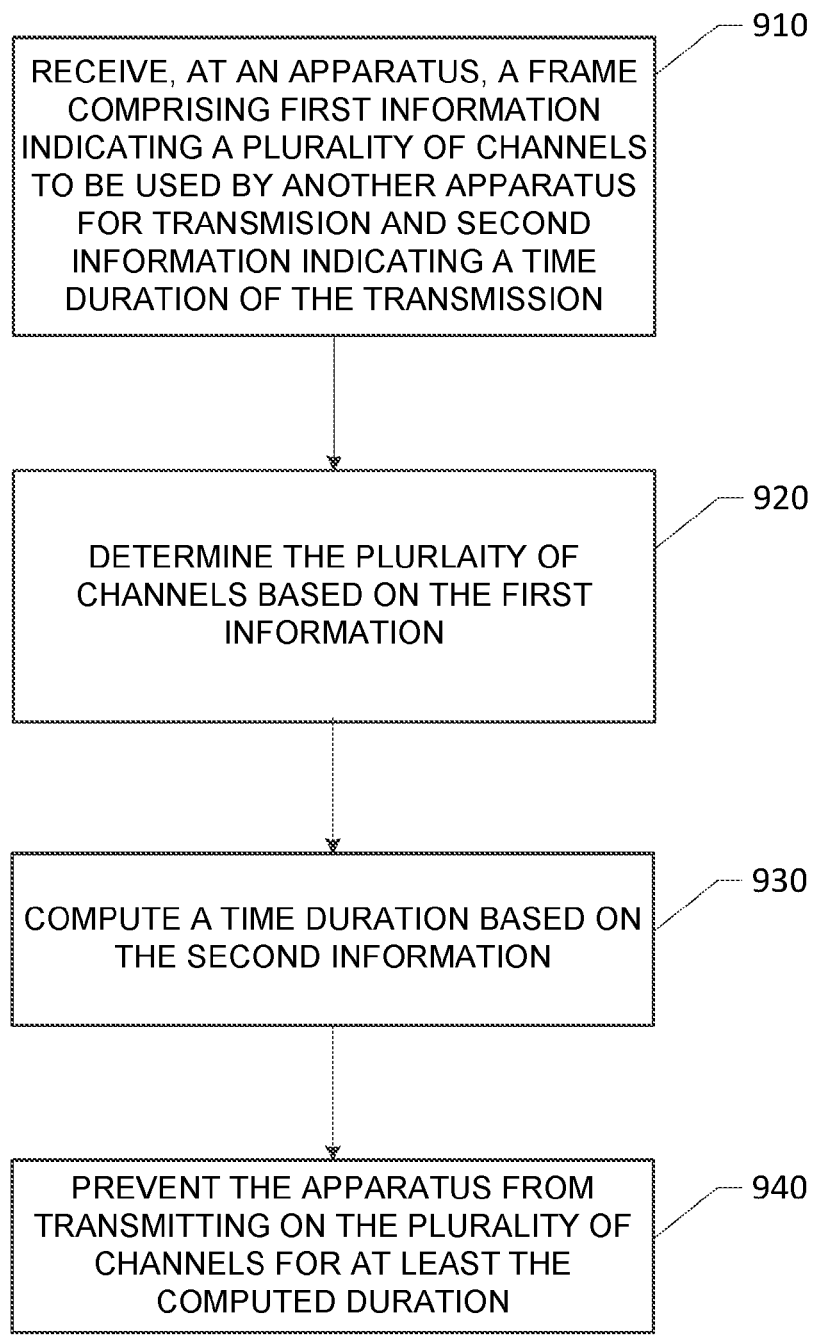
FIG. 9 is a flowchart of another method for wireless communications in accordance with certain aspects of the present disclosure.

FIG. 9 illustrates example operations 900 for wireless communication in accordance with certain aspects of the present disclosure. The operations 900 may be performed, for example, by a wireless node (e.g., an access point 110 or access terminal 120).

At 910, a frame is received at an apparatus, the frame comprising first information indicating a plurality of channels to be used by another apparatus for a transmission and second information indicating a time duration of the transmission.

At 920, the plurality of channels is determined based on the first information. At 930, a time duration is computed based on the second information. At 940, the apparatus is prevented from transmitting on the plurality of channels for at least the computed duration.

Figure 10:
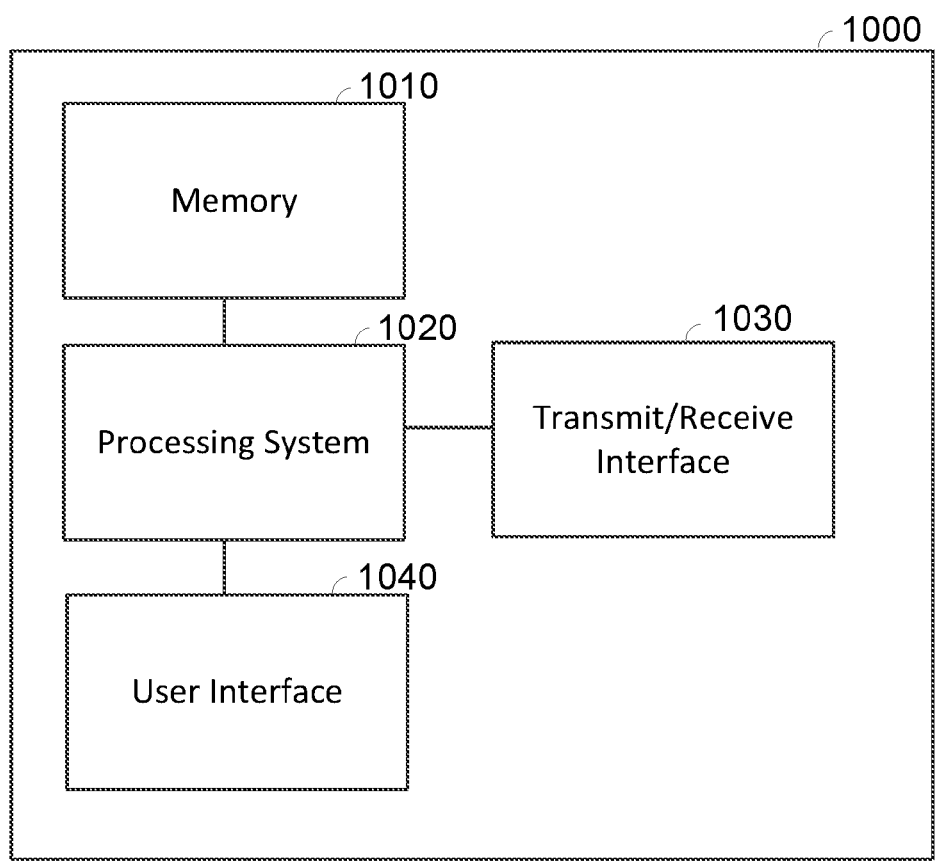
FIG. 10 is a block diagram illustrating a device in accordance with certain aspects of the present disclosure.

FIG. 10 illustrates an example device 1000 according to certain aspects of the present disclosure. The device 1000 may be configured to operate in an access point 110 or an access terminal 120 and to perform one or more of the operations described herein. The device 1000 includes a processing system 1020, and a memory 1010 coupled to the processing system 1020. The memory may store instructions that, when executed by the processing system 1020, cause the processing system 1020 to perform one or more of the operations described herein. Exemplary implementations of the processing system 1020 are provided below. The device 1000 also comprises a transmit/receiver interface 1030 coupled to the processing system 1020. The interface 1030 (e.g., interface bus) may be configured to interface the processing system 1020 to a radio frequency (RF) front end (e.g., transceiver 226 or 266), as discussed further below.

In certain aspects, the processing system 1020 may include a transmit data processor (e.g., transmit data processor 220 or 260), a frame builder (e.g., frame builder 222 or 262), a transmit processor (e.g., transmit processor 224 or 264) and/or a controller (e.g., controller 234 or 274) for performing one or more of the operations described herein. In these aspects, the processing system 1020 may generate a frame and output the frame to an RF front end (e.g., transceiver 226 or 266) via the interface 1030 for wireless transmission (e.g., to an access point or an access terminal).

In certain aspects, the processing system 1020 may include a receive processor (e.g., receive processor 242 or 282), a receive data processor (e.g., receive data processor 244 or 284) and/or a controller (e.g., controller 234 or 274) for performing one or more of the operations described herein. In these aspects, the processing system 1020 may receive a frame from an RF front end (e.g., transceiver 226 or 266) via the interface 1030 and process the frame according to any one or more of the aspects discussed above.

In the case of an access terminal 120, the device 1000 may include a user interface 1040 coupled to the processing system 1020. The user interface 1040 may be configured to receive data from a user (e.g., via keypad, mouse, joystick, etc.) and provide the data to the processing system 1020. The user interface 1040 may also be configured to output data from the processing system 1040 to the user (e.g., via a display, speaker, etc.). In this case, the data may undergo additional processing before being output to the user. In the case of an access point 110, the user interface may be omitted.

Examples of means for generating a frame comprising first information indicating a plurality of channels to be used by the apparatus for a transmission and second information indicating a time duration of the transmission include the frame builder 222 or 262, the controller 234 and 274, and the processing system 1020. Examples of means for outputting the frame for wireless transmission on at least one of the plurality of channels include the transmit processor 224 or 264, the transceiver 226 or 266, and the transmit/receive interface 1030. Examples of means for inserting at least a portion of the first information in a reserved field of the header include the frame builder 222 or 262, the controller 234 and 274, and the processing system 1020. Examples of means for inserting the second information in a length field of the header include the frame builder 222 or 262, the controller 234 and 274, and the processing system 1020. Examples of means for inserting at least a portion of the first information in N least significant bit positions of the length field of the header include the frame builder 222 or 262, the controller 234 and 274, and the processing system 1020. Examples of means for inserting a first portion of the first information in a reserved field of the header and means for inserting a second portion of the first information in a length field of the header include the frame builder 222 or 262, the controller 234 and 274, and the processing system 1020. Means for encoding and modulating the header using a modulation and coding scheme (MCS) that is lower than a MCS used to encode and modulate data in a payload of the frame include the frame builder 222 or 262, the processing system 1020, the transmit processor 224 or 264, and the transmit/receive interface 1030. Examples of means for computing a first transmission duration based on a first value, the first value corresponding to the time duration of the transmission include the controller 234 and 274, and the processing system 1020. Examples of means for replacing N least significant bits of the first value with at least a portion of the first information to obtain a second value include the frame builder 222 or 262, the controller 234 and 274, and the processing system 1020. Examples of means for computing a second transmission duration based on the second value include the controller 234 and 274, and the processing system 1020. Examples of means for inserting the second value in the frame if the first transmission duration and the second transmission duration are approximately equal include the frame builder 222 or 262, the controller 234 and 274, and the processing system 1020. Examples of means for reducing the second value by a certain amount to obtain a third value if the second transmission duration is greater than the first transmission duration include the controller 234 and 274, and the processing system 1020. Examples of means for inserting the third value in the frame, wherein the third value comprises the second information and the at least portion of the first information include the frame builder 222 or 262, the controller 234 and 274, and the processing system 1020. Examples of means for increasing the second value by a certain amount to obtain a third value if the second transmission duration is less than the first transmission duration include the controller 234 and 274, and the processing system 1020. Examples of means for inserting the third value in the frame, wherein the third value comprises the second information and the at least portion of the first information include the frame builder 222 or 262, the controller 234 and 274, and the processing system 1020.

Examples of means for receiving a frame comprising first information indicating a plurality of channels to be used by another apparatus for a transmission and second information indicating a time duration of the transmission include the transceiver 226 or 266, the receive processor 242 or 282, and the transmit/receive interface 1030. Examples of means for determining the plurality of channels based on the first information include the controller 234 and 274, and the processing system 1020. Examples of means for computing a time duration based on the second information include the controller 234 and 274, and the processing system 1020. Examples of means for preventing the apparatus from transmitting on the plurality of channels for at least during the computed time duration include the controller 234 and 274, and the processing system 1020. Examples of means for retrieving the first information from the header include the receive processor 242 or 282, the controller 234 and 274, and the processing system 1020. Examples of means for retrieving at least a portion of the first information from a reserved field of the header include the receive processor 242 or 282, the controller 234 and 274, and the processing system 1020. Examples of means for retrieving the second information from a length field of the header include the receive processor 242 or 282, the controller 234 and 274, and the processing system 1020. Examples of means for retrieving at least a portion of the first information from N least significant bit positions of the length field of the header include the receive processor 242 or 282, the controller 234 and 274, and the processing system 1020. Examples of means for retrieving a first portion of the first information from a reserved field of the header, and means for retrieving a second portion of the first information from a length field of the header include the receive processor 242 or 282, the controller 234 and 274, and the processing system 1020. Examples of means for demodulating and decoding the header using a modulation and coding scheme (MCS) that is lower than a MCS used to decode and demodulate data in a data payload of the frame include the receive processor 242 or 282, the processing system 1020, and the transmit/receive interface 1030.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by an access terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a processing system configured to:
      generate a frame comprising first information indicating a plurality of channels to be used by the apparatus for a transmission and second information indicating a time duration of the transmission, wherein the frame includes a header, and the first information is located in the header;
      insert at least a first portion of the first information in a reserved field of the header;
      insert the second information in a length field of the header; and
      insert at least a second portion of the first information in N least significant bit positions of the length field of the header, N being an integer; and
   an interface configured to output the frame for wireless transmission on at least one of the plurality of channels.

2. The apparatus of claim 1, wherein the first portion of the first information indicates a first one of the plurality of channels and the second portion of the first information indicates a number of the plurality of channels.

3. The apparatus of claim 2, wherein each one of the plurality of channels is identified by a different one of a plurality of codes, and the first portion of the first information comprises the one of the plurality of codes identifying the first one of the plurality of channels.

4. The apparatus of claim 1, wherein the plurality of channels are contiguous.

5. The apparatus of claim 1, wherein the processing system is configured to encode and modulate the header using a modulation and coding scheme (MCS) that is lower than a MCS used to encode and modulate data in a payload of the frame.

6. An apparatus for wireless communications, comprising:
   a processing system configured to:
      generate a frame comprising first information indicating a plurality of channels to be used by the apparatus for a transmission and second information indicating a time duration of the transmission;
      compute a first transmission duration based on a first value, the first value corresponding to the time duration of the transmission;
      replace N least significant bits of the first value with at least one portion of the first information to obtain a second value, N being an integer;
      compute a second transmission duration based on the second value; and
      insert the second value in the frame if the first transmission duration and the second transmission duration are approximately equal, wherein the second value comprises the second information and the at least one portion of the first information; and
   an interface configured to output the frame for wireless transmission on at least one of the plurality of channels.

7. The apparatus of claim 6, wherein the first transmission duration comprises a first network allocation vector (NAV) value and the second transmission duration comprises a second NAV value.

8. The apparatus of claim 6, wherein, if the second transmission duration is greater than the first transmission duration, the processing system is configured to:
   reduce the second value by a certain amount to obtain a third value; and
   insert the third value in the frame, wherein the third value comprises the second information and the at least one portion of the first information.

9. The apparatus of claim 6, wherein, if the second transmission duration is less than the first transmission duration, the processing system is configured to:
   increase the second value by a certain amount to obtain a third value; and
   insert the third value in the frame, wherein the third value comprises the second information and the at least one portion of the first information.

10. The apparatus of claim 6, wherein the processing system is configured to insert the second value in a length field of the frame if the first transmission duration and the second transmission duration are approximately equal.

11. The apparatus of claim 6, further comprising at least one antenna, wherein the interface is configured to output the frame for wireless transmission via the at least one antenna, and the apparatus is configured as a wireless node.

12. A wireless node, comprising:
   at least one antenna;
   a processing system configured to:
      generate a frame comprising first information indicating a plurality of channels to be used by the wireless node for a transmission and second information indicating a time duration of the transmission, wherein the frame includes a header, and the first information is located in the header;
      insert at least a first portion of the first information in a reserved field of the header;
      insert the second information in a length field of the header; and
      insert at least a second portion of the first information in N least significant bit positions of the length field of the header, N being an integer; and
   a transmitter for transmitting, via the at least one antenna, the frame.

13. An apparatus for wireless communications, comprising:
   an interface to receive a frame comprising first information indicating a plurality of channels to be used by another apparatus for a transmission and second information indicating a time duration of the transmission; and a processing system configured to:
retrieve the first information from a header of the frame;
retrieve at least a first portion of the first information from a reserved field of the header;
retrieve the second information from a length field of the header;
retrieve at least a second portion of the first information from N least significant bit positions of the length field of the header, N being an integer; and
determine the plurality of channels based on the first information, to compute a time duration based on the second information, and to prevent the apparatus from transmitting on the plurality of channels for at least during the computed time duration.

14. The apparatus of claim 13, wherein the computed time duration comprises a network allocation vector (NAV) value.

15. The apparatus of claim 13, wherein the first portion of the first information indicates a first one of the plurality of channels and the second portion of the first information indicates a number of the plurality of channels.

16. The apparatus of claim 13, wherein the processing system is configured to demodulate and decode the header using a modulation and coding scheme (MCS) that is lower than a MCS used to decode and demodulate data in a data payload of the frame.

17. The apparatus of claim 13, further comprising at least one antenna, wherein the interface is configured to receive the frame via the at least one antenna, and the apparatus is configured as a wireless node.

* * * * *